United States Patent
Lux et al.

(10) Patent No.: US 10,930,933 B2
(45) Date of Patent: Feb. 23, 2021

(54) CONDUCTIVE POLYMER BINDER FOR A NOVEL SILICON/GRAPHENE ANODE IN LITHIUM ION BATTERIES

(71) Applicant: Bayerische Motoren Werke Aktiengesellschaft, Munich (DE)

(72) Inventors: Simon Lux, Oakland, CA (US); Ann-Christin Gentschev, Munich (DE); Thorsten Langer, Munich (DE); Gao Liu, Piedmont, CA (US); Hui Zhao, Emeryville, CA (US); Zhe Jia, Emeryville, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 41 days.

(21) Appl. No.: 15/260,445

(22) Filed: Sep. 9, 2016

(65) Prior Publication Data
US 2018/0076459 A1    Mar. 15, 2018

(51) Int. Cl.
| | | |
|---|---|---|
| H01B 1/20 | (2006.01) | |
| H01M 4/04 | (2006.01) | |
| H01M 4/134 | (2010.01) | |
| H01M 4/133 | (2010.01) | |
| H01M 4/62 | (2006.01) | |
| H01M 4/1395 | (2010.01) | |
| H01M 4/1393 | (2010.01) | |
| H01M 4/36 | (2006.01) | |
| H01M 4/38 | (2006.01) | |
| H01M 4/587 | (2010.01) | |
| H01M 10/0525 | (2010.01) | |

(52) U.S. Cl.
CPC ......... *H01M 4/622* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/587* (2013.01); *H01M 10/0525* (2013.01); *H01M 2220/20* (2013.01)

(58) Field of Classification Search
CPC ........ H01M 4/133; H01M 4/134; H01M 4/38; H01M 4/62; H01M 4/0402; H01M 4/1395; H01M 4/364; H01M 4/1393; H01M 4/622; H01B 1/04; H01B 1/20; H01B 1/24
See application file for complete search history.

(56) References Cited

U.S. PATENT DOCUMENTS

| | | | |
|---|---|---|---|
| 8,778,538 B2 * | 7/2014 | Kung | H01B 1/18 429/231.8 |
| 9,153,353 B2 | 10/2015 | Liu et al. | |
| 2009/0176159 A1 | 7/2009 | Zhamu et al. | |
| 2012/0231326 A1 | 9/2012 | Biswal et al. | |
| 2013/0260239 A1 | 10/2013 | Liu et al. | |
| 2014/0203217 A1 | 7/2014 | Hwang et al. | |
| 2014/0255785 A1 * | 9/2014 | Do | C09D 1/00 429/231.8 |
| 2015/0000118 A1 | 1/2015 | Zhao et al. | |
| 2015/0028022 A1 | 1/2015 | Moon et al. | |
| 2015/0072240 A1 | 3/2015 | Yoo et al. | |
| 2015/0243996 A1 | 8/2015 | Liu et al. | |
| 2018/0076458 A1 | 3/2018 | Lux et al. | |
| 2018/0337407 A1 | 11/2018 | Liu et al. | |

OTHER PUBLICATIONS

Park et al., "Side-Chain Conducting and Phase-Separated Polymeric Binders for High-Perfomance Silicon Anodes in Lithium-Ion Batteries", J. Am. Chem. Soc. 2015, 137, pp. 2565-2571.
Chen et al., "Noncovalent Sidewall Functionalization of Single-Walled Carbon Nanotubes for Protein Immobilization", J. Am. Chem. Soc., 2001, pp. 3838-3839, vol. 123, American Chemical Society (two pages).
International Search Report (PCT/ISA/210) issued in PCT Application No. PCT/EP2017/071863 dated Nov. 29, 2017 (five (5) pages).
International Search Report (PCT/ISA/210) issued in PCT Application No. PCT/EP2017/071864 dated Nov. 29, 2017 (five (5) pages).
Zhao, H. et al., "Conductive Polymer Binder for High-Tap-Density Nanosilicon Material for Lithium-Ion Battery Negative Electrode Application", Nano Letters, Nov. 24, 2015, vol. 15, No. 12, pp. 7927-7932, XP055425015 (17 pages).
Zheng, T. et al, "Molecular Spring Enabled High-Performance Anode for Lithium Ion Batteries", Polymers 2017, MDPI, Nov. 29, 2017, pp. 1-10 (10 pages).
Farhangi, S. et al, "Effect of Side-Chain Length on the Polymer Chain Dynamics of Poly (alkyl methcrylate)s in Solution", Macromolecules 2013, ACS Publications, Dec. 2, 2013, vol. 46, pp. 9738-9747 (10 pages).
Farhangi, S. et al., "Characterization of the Long-Range Internal Dynamics of Pyrene-Labeled Macromolecules by Pryene Excimer Fluorescence", Macromolecules 2016, ACS Publications , Dec. 7, 2016, vol. 49, pp. 9597-9604 (eight (8) pages).
Non-Final Rejection issued in related U.S. Appl. No. 15/260,421 (15 pages).

* cited by examiner

*Primary Examiner* — Haidung D Nguyen
(74) *Attorney, Agent, or Firm* — Crowell & Moring LLP (57) ABSTRACT

A composite electrode prepared from silicon-graphene material and conductive polymer binder poly (1-pyrenemethyl methacrylate-co-methacrylic acid) for use in lithium-ion batteries.

14 Claims, 5 Drawing Sheets
(4 of 5 Drawing Sheet(s) Filed in Color)

CONDUCTIVE POLYMER BINDER FOR A NOVEL SILICON/GRAPHENE ANODE IN LITHIUM ION BATTERIES

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

FIELD OF THE INVENTION

The present disclosure relates generally to lithium-ion batteries, and more specifically a lithium-ion battery using silicon-graphene and conductive polymer binder composite electrodes.

BACKGROUND OF THE INVENTION

Lithium ion rechargeable batteries are a prime candidate for a variety of devices, including electric vehicle (EV) and hybrid electric vehicle (HEV) applications, due to their high energy capacity and light weight. All cells are built from a positive electrode (cathode) and a negative electrode (anode), electrically isolated by a thin separator and combined with a liquid transporting medium, the electrolyte. Typically, the anode of a conventional Li-ion cell is a composite electrode including at least one active material, i.e., carbonaceous materials, a conductive additive, and a polymeric binder, the cathode is typically a composite electrode too, with a metal oxide as the active material, a conductive additive, and a polymeric binder, and the electrolyte. Both the anode and the cathode contain active materials into which lithium ions insert and extract. The lithium ions move through an electrolyte from the negative electrode (anode) to the positive electrode (cathode) during discharge, and in reverse, from the positive electrode (cathode) to the negative electrode (anode), during recharge.

Electrode design has been a key aspect in achieving the energy and power density, and life performance required for electric vehicle (EV) batteries. State-of-art lithium-ion electrodes have used a polymer binder to ensure the integrity of the composite electrode for a dimensionally stable laminate. The polymer binder plays a critical function in maintaining mechanical electrode stability and electrical conduction during the lithium insertion and removal process. Typical binders which can be used are starch, carboxymethyl cellulose (CMC), diacetyl cellulose, hydroxypropyl cellulose, ethylene glycol, polyacrylates, poly(acrylic acid), polytetrafluoroethylene, polyimide, polyethylene-oxide, poly(vinylidene fluoride) and rubbers, e.g., ethylene-propylene-diene monomer (EPDM) rubber or styrene butadiene rubber (SBR), copolymers thereof, or mixtures thereof. Typically, the anode and the cathode require different binders. For example, styrene-butadiene rubber (SBR) is a binder which is mainly used to prepare the anode electrode. Polyvinylidene difluoride (PVDF) is mainly used to prepare the cathode electrode. Classic electrode materials such as lithium cobalt oxide (LiCoO$_2$) and graphite powder are dimensional-stable materials during the electrochemical processes. The polymer binder materials such as polyvinylidene difluoride (PVDF) are suitable to adhere these particles together and keep the physical contacts for electrical connection within the laminate.

This state-of-the-art approach works fairly well until the introduction of higher-capacity electrode materials such as silicon (Si) in the composite electrode. Silicon (Si) materials have been extensively explored as one of the most promising anode candidates for lithium-ion batteries because of its ability to provide over ten times greater theoretical specific capacities than conventional graphite based anodes. Additionally, because silicon is abundant, it is less costly to use when compared to other alternatives for lithium-ion battery application. However, Si volume change during cycling has created excessive stress and movement in the composite electrode and increased surface reactions. Specifically, electrochemical alloying of Li with Si gave Li$_{4.4}$Si as the final lithiation state and a capacity of 4,200 mAh/g. However, almost 320% volume expansion occurs as the material transitions from Si to the Li$_{4.4}$Si phase during charging. Because of this high volume change, the electronic integrity of the composite electrode is disrupted, and a high and continuous surface side reaction is induced, both leading to a fast capacity fading of the battery, and overall decreased battery life.

In order to use Si material, a new method to assemble Si-active material articles must be put in place, along with Si surface stabilization. With the in-depth knowledge of the Si surface properties and increased commercial supply of Si for battery applications, there is an opportunity/demand to investigate better Si assembly and stabilization for electrode application.

Accordingly, it is an object of the present invention to overcome, or at least alleviate, one or more difficulties and deficiencies related to the prior art. These and other objects and features of the present invention will be clear from the following disclosure.

SUMMARY OF THE INVENTION

The present invention combines a silicon-graphene material and a conductive polymer binder to formulate a composite electrode for use in lithium-ion batteries. The conductive polymer binder is designed to enable the stable cycling of the silicon-graphene anode material.

In one embodiment, a composite electrode for use in a lithium-ion battery is provided. The electrode comprises a silicon-graphene active material with a specific capacity between 500 and 2200 mAh/g and a conductive polymer binder, wherein the conductive polymer binder is a copolymer of 1-pyrenemethyl methacrylate and methacrylic acid. In a preferred embodiment, the methacrylic acid present in the copolymer is in an amount from about 30 to 78 mol %, and the 1-pyrenemethyl methacrylate present in the copolymer is in an amount from about 22 to 70 mol %. In another preferred embodiment, the methacrylic acid present in the copolymer is in an amount from about 10 to 51 wt %, and the 1-pyrenemethyl methacrylate present in the copolymer is in an amount from about 49 to 90 wt %.

In another embodiment, a method for making a composite electrode for use in a lithium ion battery is provided. The method comprises the steps of: forming a solution of a solvent and a conductive polymer binder; adding a silicon-graphene active material to the solution to form a slurry; mixing the slurry to form a homogeneous mixture, depositing a thin film of said thus obtained mixture over top of a substrate, and drying the resulting composite to form said electrode. The conductive polymer binder is a copolymer of 1-pyrenemethyl methacrylate and methacrylic acid. In a preferred embodiment, the methacrylic acid present in the copolymer is in an amount from about 30 to 78 mol %, and the 1-pyrenemethyl methacrylate present in the copolymer is in an amount from about 22 to 70 mol %. In another preferred embodiment, the methacrylic acid present in the copolymer is in an amount from about 10 to 51 wt %, and the 1-pyrenemethyl methacrylate present in the copolymer is in an amount from about 49 to 90 wt %.

In one embodiment, the electrode is comprised of about 1 wt % up to 20 wt % binder and about 80 to 99 wt % silicon-graphene active material. The silicon-graphene active material contains about 10 to 99 wt % of Si and about 1 to 90 wt % C. In another embodiment, a graphene additive is added to the electrode. In another embodiment, the electrode is comprised of about 5 to 20 wt % of polymer binder, about 75 to 90 wt % of silicon-graphene active material and about 1 to 15 wt % of graphene additive.

Other objects, advantages and novel features of the present invention will become apparent from the following detailed description of one or more preferred embodiments when considered in conjunction with the accompanying drawings. The disclosure is written for those skilled in the art. Although the disclosure uses terminology and acronyms that may not be familiar to the layperson, those skilled in the art will be familiar with the terminology and acronyms used herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

As used herein, "active material" means that portion of the electrode that stores lithium ions. In the case of the cathode, the active material can be a lithium-containing compound such as a lithium metal oxide complex. In the case of the counter, anode electrode the active material can be silicon or lithiated silicon.

Recently, as described in U.S. Pat. No. 9,153,353, a new approach has been developed to use electrically conductive polymer binder to connect and stabilize Si composite electrode. The conductive polymers developed in U.S. Pat. No. 9,153,353 act as a binder for the silicon particles used for the construction of negative anode. They are mixed with silicon nano-sized silicon particles in a slurry process, then coated on a substrate such as copper or aluminum and thereafter allowed to dry to form the film electrode. These conductive polymer binders have opened a new paradigm of electrode design for Si materials: they provide molecular-level electrical interactions between the electrode matrix and the active materials and accommodate volume expansion of high capacity Si materials. The cycling stability of the silicon electrode is significantly enhanced by this approach. Moreover being conductive itself, the use of conductive polymer binder eliminates the necessity of conductive additive or greatly reduces the conductive additive amount necessary; this considerably increases the loading of the active material.

Figure 1:
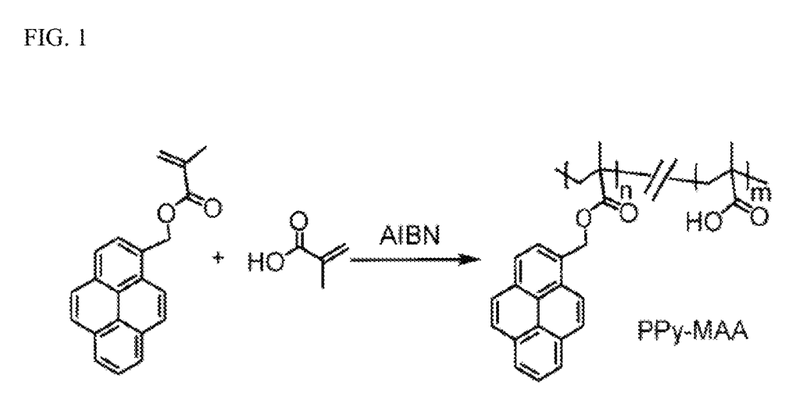
FIG. 1 illustrates a process for making the conductive co-polymer poly (1-pyrenemethyl methacrylate-co-methacrylic acid (PPy-MAA).

Our previous work established that the pyrene-based methacrylate polymer as an effective polymer binder for pure Si anode (See U.S. Pat. No. 9,153,353, and Park et al., *J. Am. Chem. Soc.,* 2015, 137, 2565-2571). Pyrene side chain furnishes the conductive nature to the polymer while allowing flexible fine-tune of the polymer structure. For example, as shown in the synthetic scheme in FIG. 1, methacrylic acid (MAA) is incorporated into a 1-pyrenemethyl methacrylate (PPy) via polymerization providing a conductive co-polymer, poly (1-pyrenemethyl methacrylate-co-methacrylic acid) (PPy-MAA). The methacrylic acid (MAA) adds carboxylic acid functionalities into the polymer binder to enhance the adhesion of the binder on the active material.

We have found that the co-polymer PPy-MAA can be used as an effective conductive binder for silicon-graphene anodes. Silicon-graphene anodes are typically synthesized from silicon nanoparticles combined with graphene sheets, a morphology which helps to maintain the electrical integrity of the electrode during the drastic volume changes during cell cycling. We found that both the conductive moiety (PPy) and the adhesion moiety (MAA) are indispensable to enable the stable cycling of silicon-graphene anode materials.

In one embodiment, a lithium ion battery is provided having a composite electrode comprising a silicon-graphene active material with a specific capacity between 500 and 2200 mAh/g and a conductive polymer binder, wherein the conductive polymer binder has a polymeric composition with repeating units of the formula:

wherein m+n=1-10 million; and m/n ratio is 9/1 to 1/9. Preferably, the m/n ratio is 7/3. The conductive polymer binder is a copolymer of 1-pyrenemethyl methacrylate and methacrylic acid. Preferably, the methacrylic acid present in the copolymer is in an amount from about 30 to 78 mol %, and the 1-pyrenemethyl methacrylate present in the copolymer is in an amount from about 22 to 70 mol %. Preferably, the methacrylic acid present in the copolymer is in an amount from about 10 to 51 wt %, and the 1-pyrenemethyl methacrylate present in the copolymer is in an amount from about 49 to 90 wt %. The electrode is composed of PPy-MAA binder in the amount of about 1 to 20 wt % and silicon-graphene active material in an amount of about 80 to 99 wt %. The silicon-graphene active material contains about 10 to 99 wt % of Si and about 1 to 90 wt % of C. In another embodiment, a graphene additive is added to the electrode. In another embodiment, the electrode is comprised of about 5 to 20 wt % of polymer binder, about 75 to 90 wt % of silicon-graphene active material and about 1 to 15 wt % of graphene additive.

In another embodiment, a method for making a composite electrode for use in a lithium ion battery is provided. The method comprises the steps of: forming a solution of a solvent and a conductive polymer binder; adding a silicon-graphene active material to the solution to form a slurry; mixing the slurry to form a homogeneous mixture; depositing a thin film of said thus obtained mixture over top of a substrate; and drying the resulting composite to form said electrode, wherein the conductive polymer binder has a polymeric composition with repeating units of the formula I:

wherein m+n=1-10 million; and m/n ratio is 9/1 to 1/9. Preferably, the m/n ratio is 7/3. Any aprotic solvents can be used in the method of making the composite electrode. The solvent is used to dissolve a polymer, makes a slurry and fabricate the lithium ion electrode. Typical aprotic solvents used are N-methyl-2-pyrrolidone (NMP), N-ethyl-2-pyrrolidone (NEP), toluene and chlorobenzene. Typically, in drying the resulting composite to form said electrode, the temperature and the time selected for drying are set based on the active material and the composition of the electrode, the slurry solvent and the target electrode thickness. In one embodiment, the conductive polymer binder is a copolymer of 1-pyrenemethyl methacrylate and methacrylic acid. In order to demonstrate the effects of the PPy-MAA polymer binder and the influence of MAA have on the electrochemical performance of the silicon-graphene anode, variable MAA contents are incorporated into the PPy-based polymer and are tested. For example, Homo-PPy, Homo-PMAA (poly(methacrylic acid)), PPy-30 mol % MAA, PPy-50 mol % MAA, and PPy-78 mol % MAA were synthesized and used as binders.

Figure 2A:
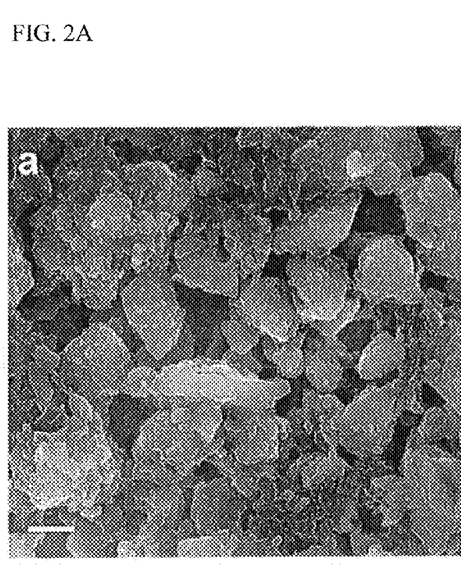
FIG. 2A shows SEM images of electrodes made with PPy-30 mol % MAA according to an embodiment of the present invention.
Figure 2B:
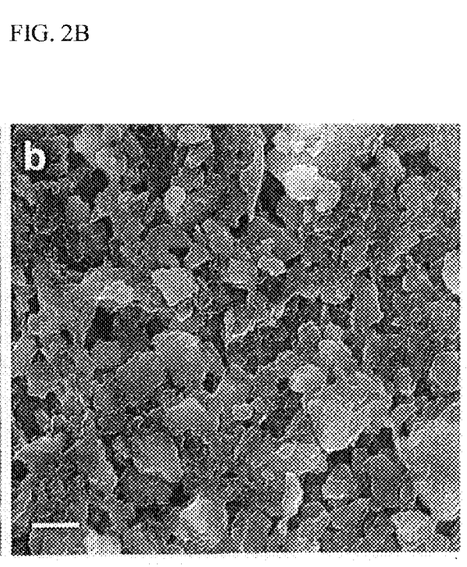
FIG. 2B shows SEM images of electrodes made with PPy-78 mol % MAA according to an embodiment of the present invention.

FIG. 2 shows the Scanning Electron Microscope (SEM) images of two polymer binders, one PPy-based polymer incorporated with 30 mol % MAA (See FIG. 2A) and the other incorporated with 78 mol % MAA (See FIG. 2B). Based on the SEM images, good porosity is obtained using either binders PPy-30 mol % MAA or PPy-78 mol % MAA. This demonstrates that these conductive polymer binders enable a uniform distribution of the active material particles during the process for making the electrode.

FIG. 3 illustrates the effects of variable MAA contents in the PPy-MAA copolymer have on the electrochemical performance of a silicon-graphene anode, where the electrode composition of the laminate is composed of 10 wt % conductive polymer binder and 90 wt % silicon-graphene active material. All the cells in FIG. 3 have a low loading of approximately 0.15 mg/cm$^2$.

Figure 3A:
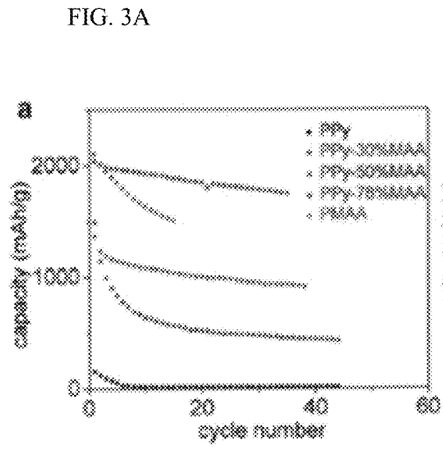
FIG. 3A illustrates the effects of variable MAA contents in a PPy-MAA copolymer on the electrochemical performance of a silicon-graphene anode, where the electrode laminate is composed of 10 wt % conductive polymer binder and 90 wt % active material.
Figure 3B:
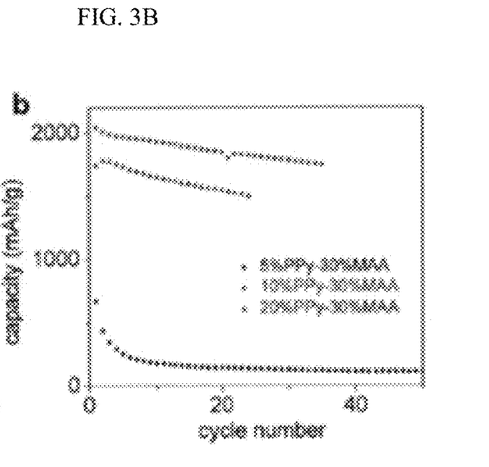
FIG. 3B illustrates the cycling performance for a 5% PPy, 10% PPy or 20% PPy-based binder, each incorporated with 30 mol % MAA.
Figure 3C:
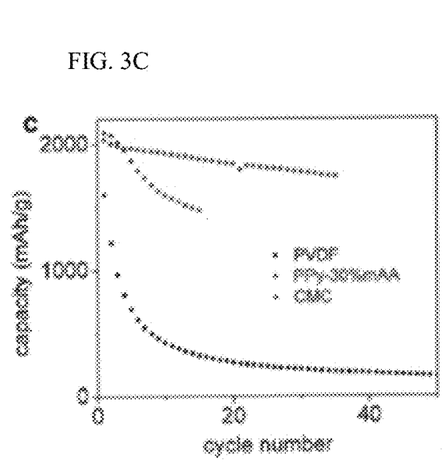
FIG. 3C illustrates the cycling performances of a silicon-graphene anode using a PPy-30 mol % MAA conductive polymer binder in comparison to two conventional binders: polyvinylidene difluoride (PVDF) and carboxymethyl cellulose (CMC). The electrode laminate is composed of 10 wt %° polymer binder and 90 wt % active material.
Figure 3D:
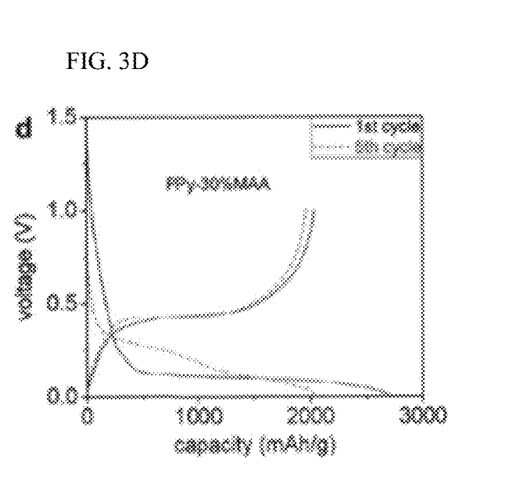
FIG. 3D plots the galvanostatic voltage curves of a PPy-30 mol % MAA cell in the $1^{st}$ cycle and the $5^{th}$ cycle.

Based on FIG. 3A electrochemical performance data, the PPy-based polymer incorporated with 30 mol % MAA content in combination with silicon-graphene delivers the best electrochemical performance. FIG. 3A shows that a full-capacity at ~2000 mAh/g is achieved, with an efficiency of 75.29% in the 1$^{st}$ cycle; and with an efficiency of 96.60% in the 5$^{th}$ cycle using the PPy-30% mol MAA binder. This relatively high efficiency ensures a long-term stable cycling without any significant parasite reaction, which is a clear advantage over conventional non-conductive polymer binders (See FIG. 3C). The voltage curves of a PPy-30 mol % MAA cell in the first and fifth cycles are shown in FIG. 3D, which indicate that there is a minimum capacity loss associated with using copolymer PPy-30 mol % MAA. Based on this data, it has demonstrated that including 30 mol % MAA in the pyrene-based methacrylate conductive polymer (i.e., PPy-30 mol % MAA) provides the best cycling performance for a silicon-graphene anode. Also, having a 10 wt % conductive polymer binder content in the electrode composition of the laminate is determined to provide the highest capacity (See FIG. 3B).

Figure 4A:
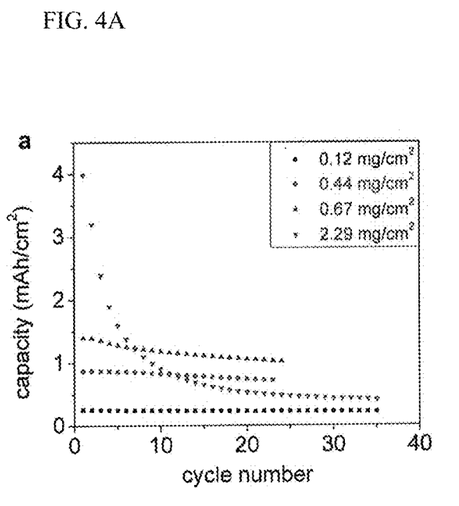
FIG. 4A illustrates how a cell performs with increasing active material loading for a 10 wt % conductive polymer binder (70% PPy+30% MAA).
Figure 4B:
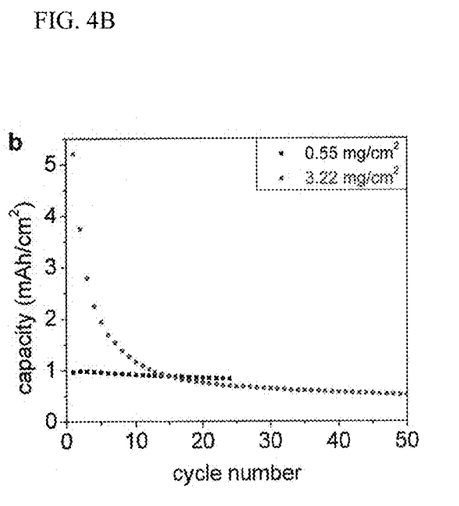
FIG. 4B illustrates how a cell performs with increasing active material loading for a 20 wt % conductive polymer binder (70% PPy+30% MAA).

In order to fabricate a high-loading laminate, both 10 wt % conductive polymer binder content (See FIG. 4A) and 20 wt % conductive polymer binder content (See FIG. 4B) are used to assess the influence of active material loading on the electrochemical performance of a silicon-graphene anode. Without any engineering of electrode architecture, 10 wt % conductive polymer binder could deliver a real capacity of ~1.2 mAh/cm$^2$ (corresponding to mass loading of 0.67 mg/cm$^2$ in FIG. 4A). For a 20 wt % conductive polymer binder content, it delivers a capacity of ~1 mAh/cm$^2$ (corresponding to massing loading of 0.55 mg/cm$^2$ in FIG. 4B).

Figure 5A:
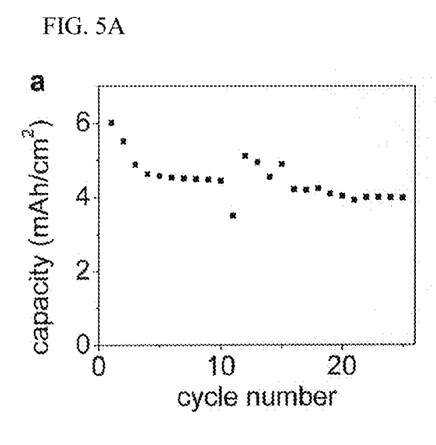
FIG. 5A plots the capacity vs. cycle number for a 10% PPy-MAA binder, 30% graphene additive, 60% silicon-graphene anode at a cycling rate C/10 (150 mA/g).
Figure 5B:
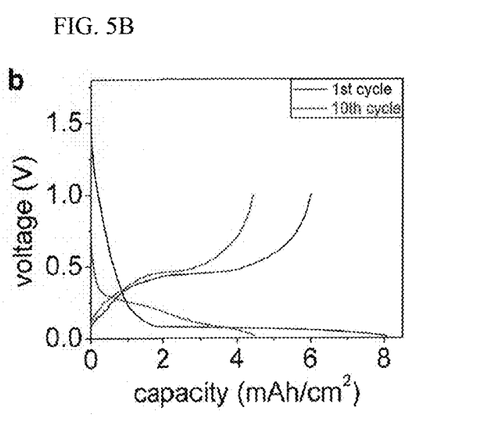
FIG. 5B plots the voltage vs. capacity for a 10% PPy-MAA binder, 30% graphene additive, 60% silicon-graphene anode at a cycling rate C/10 (150 mA/g) at the 1 and $10^{th}$ cycle.

To further improve the high loading cell performance, an extra 10% graphene additive is added into the laminate. The cell cycling performance for a 10% PPy-MAA binder, 30% graphene additive, 60% silicon-graphene anode is shown in FIG. 5. Based on a cycling rate of C/10 (150 mA/g), an area capacity of above 4 mAh/cm$^2$ is achieved (See FIG. 5A). Voltage profiles at 1$^{st}$ and 10$^{th}$ cycles are shown in FIG. 5B.

Figure 6:
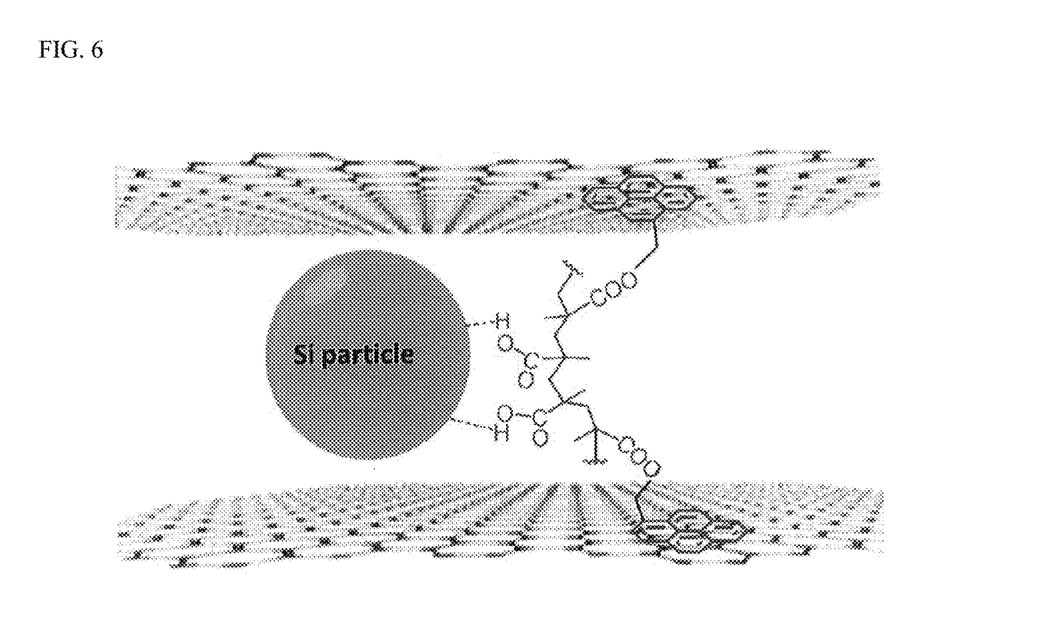
FIG. 6 is a schematic description of how a PPy-MAA binder enhances the electrochemical performance of a silicon-graphene anode.

FIG. 6 illustrates the interaction between a PPy-MAA binder and a silicon-graphene anode according an embodiment of the invention, where the carboxylate groups on MAA strongly bonds with the OH groups on the Si particle. The affinity between a pyrene unit and a graphene sheet is already well-known in the art (Dai, H., *J. Am. Chem. Soc.*, 2001, 123, 3838-3839). As shown in FIG. 6, the incorporation of MAA-containing moiety further enhances the binding property, which is of paramount importance to maintaining the electrode integrity during drastic volume change in lithiation and delithiation. These PPy-MAA binder offers better binding strength, and much improved capacity retention and efficiency compared to using conventional polyacrylic acid (PAA) and carboxymethyl cellulose (CMC) binders. In short, the PPy-MAA binder of the present invention provides both electronic conductivity and strong adhesion for the silicon-graphene anode, in turn provides excellent cycling performance. For example, a high-loading cell which delivers a real capacity of 4 mAh/cm$^2$ is obtainable by using the binder/silicon-graphene electrode of the present invention.

It should be recognized that the one or more examples in the disclosure are non-limiting examples and that the present invention is intended to encompass variations and equivalents of these examples.

EXAMPLES

Electrode Compositions: All electrode laminates are made with conductive polymer binders and active anode materials in a NMP-based slurry. The active anode material silicon-graphene is commercially available and can be obtained from XG Sciences, Inc. Pyrene-based conductive binders were synthesized as described in U.S. Pat. No. 9,153,353.

Chemicals: All the starting chemical materials for the synthesis of the conductive polymer were purchased from Sigma-Aldrich. Electrolytes were purchased from Novolyte Technologies (now part of BASF), including battery-grade lithium hexafluorophosphate (LiPF$_6$) in ethylene carbonate (EC), diethyl carbonate (DEC) and fluoroethylene carbonate (FEC). A Celgard 3501 separator membrane was purchased from Celgard. Other chemicals were purchased from Sigma Aldrich and used without any further purification.

Process for Making the Electrode:

All electrode laminates were cast onto a 20 μm thick battery-grade Cu sheet using a Mitutoyo doctor blade and a Yoshimitsu Seiki vacuum drawdown coater to roughly the same loading per unit area of active material. The films and laminates were first dried under infrared lamps for 1 h until most of the solvent was evaporated and they appeared dried. The films and laminates were further dried at 130° C. under 10$^{-2}$ torr dynamic vacuum for 24 h. The film and laminate thicknesses were measured with a Mitutoyo micrometer with an accuracy of +1 μm. Several loadings and thicknesses up to 4.8 mAh/cm$^2$ were done and the electrodes were also pressed and un-pressed using a calender machine from International Rolling Mill equipped with a continuously adjustable gap.

Process for Fabricating Coin Cell:

Coin cell assembly was performed using standard 2325 coin cell hardware. A 1.47 cm diameter disk was punched out from the laminate for use in the coin cell assembly as a working electrode. Lithium foil (obtained from FMC Corporation) was used in making the counter electrode. The counter electrodes were cut to 1.5 cm diameter disks. The working electrode was placed in the center of the outer shell of the coin cell assembly and two drops of 30% FEC, 1.2 M LiPF$_6$ in EC/DEC=3/7 electrolyte purchased from BASF were added to wet the electrode. A 2 cm diameter of Celgard 2400 porous polyethylene separator was placed on top of the working electrode. Three more drops of the electrolyte were added to the separator. The counter electrode was placed on the top of the separator. Special care was taken to align the counter electrode symmetrically above the working electrode. A stainless steel spacer and a Belleville spring were placed on top of the counter electrode. A plastic grommet was placed on top of the outer edge of the electrode assembly and crimp closed with a custom-built crimping machine manufactured by National Research Council of Canada. The entire cell fabrication procedure was done in an Ar-atmosphere glove box.

Process for Testing Coin Cell:

The coin cell performance was evaluated in a thermal chamber at 30° C. with a Maccor Series 4000 Battery Test System. In a constant charge capacity cycling, the coin cells were first lithiated to a certain degree corresponding to a calculated specific capacity, then delithiated back to 1V. A lower cut-off voltage was set to 10 mV. The capacity of the material was calculated on the bases of the theoretical capacity and the amount of the materials used within the electrode.

The invention claimed is:

1. A composite electrode for use in a lithium-ion battery, comprising:
    a silicon-graphene active material with a specific capacity between 500 and 2200 mAh/g and a conductive polymer binder,
    wherein the conductive polymer binder has a polymeric composition with repeating units of the formula:

wherein m+n=1-10 million; and m/n ratio is 9/1 to 1/9,
    wherein the conductive polymer binder is a copolymer of 1-pyrenemethyl methacrylate and methacrylic acid and the methacrylic acid present in the copolymer is in an amount from about 30 to 78 mol %,
    wherein the silicon-graphene active material is synthesized from silicon nanoparticles combined with graphene sheets, and
    wherein the electrode further comprises a graphene additive.

2. The composite electrode of claim 1, wherein the m/n ratio is 7/3.

3. The composite electrode of claim 1, wherein the 1-pyrenemethyl methacrylate present in the copolymer is in an amount from about 22 to 70 mol %.

4. The composite electrode of claim 1, wherein the methacrylic acid present in the copolymer is in an amount from about 10 to 51 wt % and the 1-pyrenemethyl methacrylate present in the copolymer is in an amount from about 49 to 90 wt %.

5. The composite electrode of claim 1, wherein the electrode is comprised of about 1 to 20 wt % of polymer binder and about 80 to 99 wt % of silicon-graphene active material.

6. The composite electrode of claim 1, wherein the silicon-graphene active material contains about 10 to 99 wt % of Si and about 1 to 90 wt % of C.

7. The composite electrode of claim 1, wherein the electrode is comprised of about 5 to 20 wt % of polymer binder, about 75 to 90 wt % of silicon-graphene active material and about 1 to 15 wt % of graphene additive.

8. A method for making a composite electrode for use in a lithium ion battery comprising the steps of:

forming a solution of a solvent and a conductive polymer binder;

adding a silicon-graphene active material to the solution to form a slurry;

mixing the slurry to form a homogeneous mixture;

depositing a thin film of said thus obtained mixture over top of a substrate; and drying the resulting composite to form said electrode, wherein the silicon-graphene active material has a specific capacity between 500 and 2200 mAh/g, and is synthesized from silicon nanoparticles combined with graphene sheets, wherein the conductive polymer binder has a polymeric composition with repeating units of the formula:

wherein m+n=1-10 million; m/n ratio is 9/1 to 1/9, wherein the conductive polymer binder is a copolymer of 1-pyrenemethyl methacrylate and methacrylic acid and the methacrylic acid present in the copolymer is in an amount from about 30 to 78 mol %, wherein the electrode further comprises a graphene additive.

9. The method of claim 8, wherein the m/n ratio is 7/3.

10. The method of claim 8, wherein the 1-pyrenemethyl methacrylate present in the copolymer is in an amount from about 22 to 70 mol %.

11. The composite electrode of claim 8, wherein the methacrylic acid present in the copolymer is in an amount from about 10 to 51 wt % and the 1-pyrenemethyl methacrylate present in the copolymer is in an amount from about 49 to 90 wt %.

12. The method of claim 8, wherein the electrode is comprised of about 1 to 20 wt % of polymer binder and about 80 to 99 wt % of silicon-graphene active material.

13. The method of claim 8, wherein the silicon-graphene active material contains about 10 to 99 wt % of Si and about 1 to 90 wt % of C.

14. The method of claim 8, wherein the electrode is comprised of about 5 to 20 wt % of polymer binder, about 75 to 90 wt % of silicon-graphene active material and about 1 to 15 wt % of graphene additive.

* * * * *